W. WORKMAN.
Grain Drill.
No. 36,929.  Patented Nov. 11, 1862.
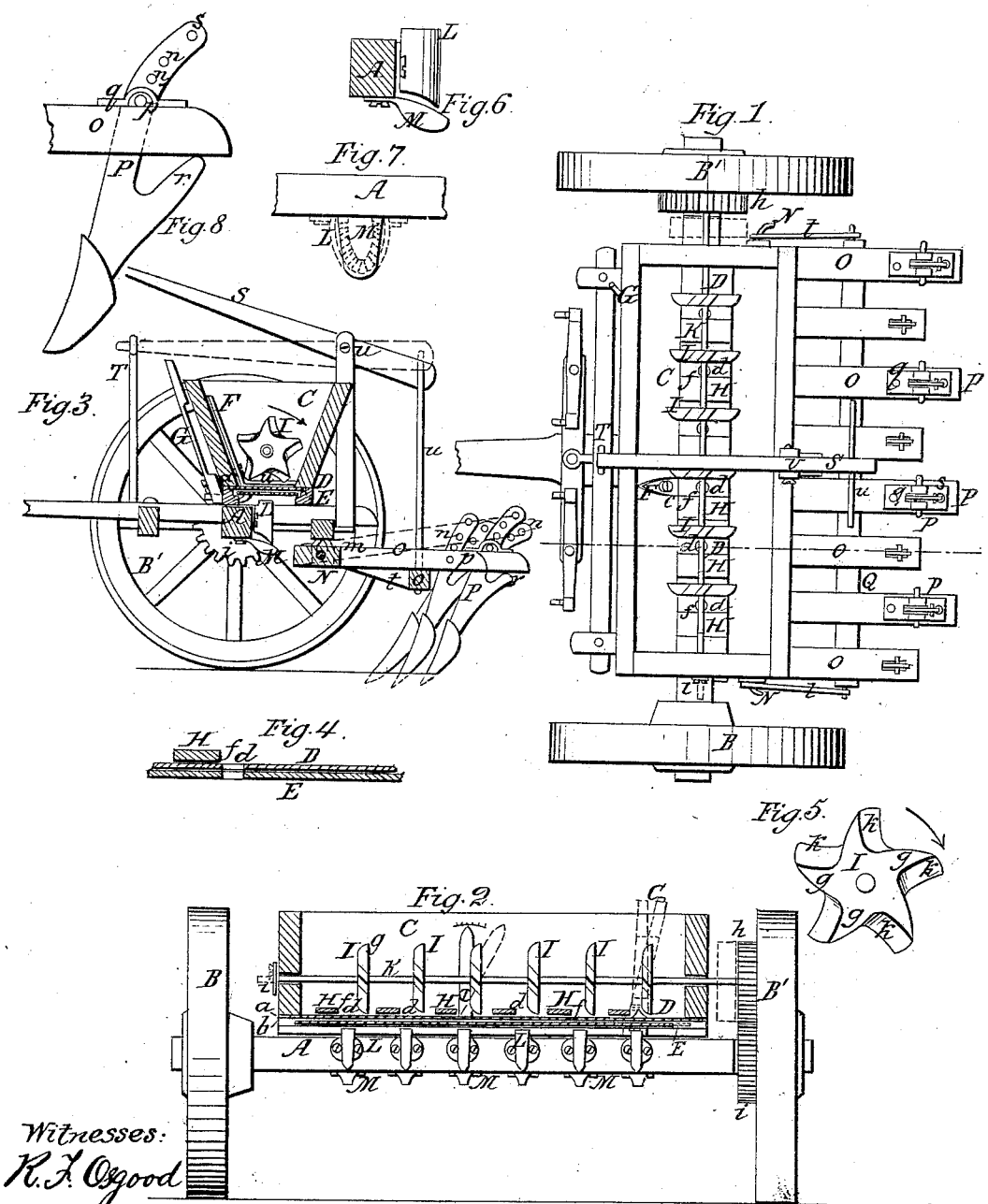

UNITED STATES PATENT OFFICE.

WILLIAM WORKMAN, OF RIPON, WISCONSIN.

IMPROVEMENT IN BROADCAST-SEEDING MACHINES.

Specification forming part of Letters Patent No. 36,929, dated November 11, 1862.

*To all whom it may concern:*

Be it known that I, WILLIAM WORKMAN, of Ripon, in the county of Fond du Lac and State of Wisconsin, have invented certain new and useful Improvements in Machines for Sowing Seed Broadcast; and I do hereby declare that the following is a full and exact description thereof, reference being had to the accompanying drawings, making part of this specification—

Figure 1 being a plan of my improved machine; Fig. 2, a central vertical section longitudinally through the hopper, showing the frame and wheels in elevation; Fig. 3, a vertical section of the machine transversely of the hopper in the plane indicated by the red line, Fig. 1; Figs. 4, 5, 6, 7, and 8, views of parts detached.

Like letters designate corresponding parts in all the figures.

My machine is of that kind usually denominated "broadcast seed-sowers;" but the seed is dropped from the bottom of the hopper through tubes, and suitably spread or scattered over the ground by a means hereinafter described.

The working parts are all mounted on or connected with a suitable beam or support, A, which forms the axle of the supporting-wheels B B', the latter of which is a driving-wheel.

The hopper C, which is the receptacle of the seed to be sown, is of suitable length and capacity for the purpose designed, and extends lengthwise of the axle on which it rests, the middle line thereof coming sufficiently behind the axle to insure the proper discharge of the seed. The entire open bottom of the hopper is covered by two thin longitudinal slides, D and E, resting closely one above the other, and their transverse edges fitting respectively in suitable grooves, *a b*, of the side pieces of the hopper. Thus these slides have individually a free adjustment independent of the other in either direction longitudinally of the hopper. To the upper slide is connected the end of a lever, F, pivoted at *c* inside the hopper, by which the adjustment in either direction is accomplished, and to the lower slide, outside the hopper, is similarly connected a spring-lever, G, by which that slide is likewise adjusted. Correspondingly at suitable and equal distances apart through both slides is made a set of vertical discharge holes or apertures, *d d d*, of sufficient size for the escape of the maximum amount of seed to be sown at any time. I prefer to use six of these discharge-holes in a machine sowing eight feet three inches wide; but their number or the distance between them may be varied as necessity or conveneience requires.

Near one edge of the discharge-openings respectively (when said openings in both slides are in a position directly one over the other) are situated transverse bars H H, extending from side to side of the hopper and resting nearly or quite in contact with the upper slide. These bars are substantially of the form represented, being of sufficient size to not only hold the slides in place, but also for their proximate edges *f f* to act as stops or shoulders, against which the seed is pressed, and thereby forced through the discharge-openings by the stirrers, as is directly described.

Intermediate with the bars H H, and on the side of the discharge-openings opposite the shoulders *f f* of said bars, are situated a set of star-pointed wheels, I I, that I denominate "stirrers." They are fixed on a horizontal shaft, K, extending lengthwise of the hopper, at a height suitable for the points *g g* of the stirrers to reach about to the bottom of the hopper, and passing through the end thereof, and having on its extremity a pinion, *h*, that gears with a cog-wheel, *i*, on the hub of the driving-wheel. The forward or acting side, *k*, of each of the points of the stirrers is made beveling or oblique, as represented most clearly in Fig. 5, in such a manner that the edge of the points on the side of the stirrer away from its corresponding discharge-opening shall stand forward and be sharp, and the side next the discharge-opening shall gradually incline to the vertical face of the point. The extremities of the points are also brought down to a sharp edge, and are rounded laterally from the knife-edge to the opposite side. By this form the points of the stirrers receive the least resistance from the grain in which they move, while their action in pressing the grain forward to the discharge-openings is most effective. It also possesses the merit of not breaking or grinding the grains or kernels, as is the case with most devices for accomplishing the same purpose. The action from the time that the sharp edges strike the seed till they force it forward the thickness of the stirrer is so gradual and easy that no harm to the kernels can ensue.

By the arrangement of the slides D E and cross-bars H above described I am enabled to gage the amount of seed passing out of the hopper to any degree desired. If the maximum amount is to be sown, the slides are adjusted so that the discharge-opening in both shall come directly in coincidence, and so that they are entirely free of the edge of the cross-bars. This insures the fullest capacity of the openings for discharge. But if a smaller quantity is to be sown the upper slide is adjusted back by means of the lever F, so as to bring the edge of its discharge-openings, respectively, under the edge of the corresponding bars, H H, to such a degree as to lessen the capacity of the openings to the extent commensurate with the amount of seed to be sown. This adjustability of the upper slide to different degrees of discharge is illustrated most clearly in the diagram Fig. 4, in which the position of the discharge-openings, as indicated by black lines, is outside of the bars, to correspond with the maximum effect, while the position of the same, as shown in red lines, is with one edge of the discharge-openings drawn under the bars to decrease the discharge. The lever F, for producing this adjustability of its slide, may be made pointed at the top for an index, and a scale on the side of the hopper may be used in connection with it, to indicate the amount of adjustment at any time to accomplish the desired effect. This adaptation of the machine to a greater or less discharge is necessary in sowing different kinds of seed, and in sowing it thicker at some times than at others, and the means that I employ to secure the desired result is very simple and effective, the cross-bars serving the double purpose of a security for the retaining of the slides and as a cover or screen for regulating the capacity of the discharge-openings when the same are drawn under them.

The adjustability of lower slide, E, is intended more particularly for entirely cutting off the discharge at any time desired—such, for instance, as when turning at the end of the field, or in passing over a portion of the ground that has already been sown. By its use in connection with the upper slide and the cross-bars the discharge can be cut off at any time without changing the gage of the said upper slide with the bars, as would have to be done were there but one slide. This is important, as it avoids the necessity of setting the gage anew at every cut-off. The position of the openings in the lower slide, when the discharge is entirely cut off, is indicated by the red lines, Fig. 4.

In addition to the advantages of the cross-bars H H in assisting to gage the discharge-opening, they serve another important purpose, and that is their edges $ff$, in proximity to the discharge-openings and opposite the corresponding stirrers, I, serve as stops or shoulders against which the seed is pressed by the oblique points $g\ g$ of said stirrers, and thereby forced in a constant, regular, and unvarying current through the discharge-escapes. This device is of the utmost importance in my machine, as the gravity of the seed itself is not sufficient to carry it through the openings in a regular and measured discharge; and, besides, it is liable to become choked and clogged, so as to entirely obstruct the action, especially in sowing grains of a light or furry nature. The use of the means here described insures the most perfect action, the pressure being equable and invariable, and such that there is no possibility of clogging. The cross-bars, in connection with the slides and stirrers, thus secure several distinct and important advantages.

The pinion $h$ of the shaft of the stirrers is kept in gear with the cog-wheel $i$ when the machine is in action by means of a flat pivoted cap or pendant, $l$, on the outside of the opposite or farther end of the hopper, as represented most clearly in Figs. 1 and 2. The end of the shaft reaches just through and rests against this pendent cap, and thus is kept from moving laterally. At any time when it is desirable to ungear the parts to arrest the motion of the stirrers, all that is necessary to do is to turn the cap up away from the end of the shaft and force the latter outward, thereby separating the gearing-wheels, as indicated by red lines in Fig. 2. This arrangement is very simple and effective, and is much cheaper than any ordinary arrangement requiring clutches, levers, &c.

Corresponding in position with the discharge-openings and directly under them are respectively situated conductors or tubes, L L, for conveying the seed; and under the conductors are respectively situated curved pieces, M M, which, from their office, I denominate "scatterers." The conductors are conveniently secured by means of flanges to the rear of the axle and the scatterers in a similar manner to the bottom. The shape of the conductors is peculiar, the outline in horizontal cross-section being elongated, (as indicated by the red lines in Fig. 7,) and gradually decreasing in breadth of said outline of section, but not in length, so as to present at the bottom an outlet that is oblong lengthwise of said scatterers, but narrow crosswise, thus forming a somewhat flaring tube concentrating at the bottom directly over the longitudinal center of the scatterers. The form of the scatterers is substantially that indicated in Figs. 6 and 7—that is, the upper longitudinal outline is somewhat curved, inclining downward as it extends outward, while the outline in vertical cross-section is convex, thus leaving a rounded inclining surface of the whole, which is the most effective in dispersing the seed falling thereon. Thus arranged, the seed as it falls from the discharge-openings is received in the broad, open, upper end of the conductors, and in passing therethrough is concentrated at the bottom into a narrow elongated discharge, which falls directly onto the longitudinal center of the scatterers, whence it is equally distributed on all sides. This shape of the conductors for concentrating the seed, in connection with the scatterers, is essential, more particularly in passing over a hillside with one wheel raised higher than the other. In this case the grain is distributed on the upper as well as the lower side, whereas were the conductors made plane tubes of equal diameter at the bottom as at the top the large openings would allow the seed to fall only on the lower side of the scatterers and be distributed alone in that direction.

At a suitable distance in the rear of the hopper is situated a parallel shaft, N, secured in bearing $m$ $m$ of the frame. On this shaft rest and turn the inner ends of teeth-bars O O, of proper size, extending back and being preferably of different lengths alternately, as represented. In the rear ends of these bars are made slots, in which fit respectively the shanks P P of the teeth, by which the sown grain is harrowed in and covered. The shanks are respectively provided at the proper position with a set of adjusting holes, $n$ $n$ $n$, Fig. 8, consisting of two, three, or more, through either of which and the sides of the teeth-bars wooden pins $p$ $p$ are inserted for retaining the shanks in place. Instead of being secured through the side of the teeth-bars, the wooden pins may pass through flanges of castings $q$ on the top of the bars in which the shank rests. Beneath the teeth-bars the shanks are respectively provided with forks or projections $r$ $r$, substantially of the shape and arrangement shown—that is, projecting backward and upward rearwardly, and at such a distance from the main member that they will serve as braces resting against the under side of the teeth-bars, and thus sustain the teeth against any obstruction that may be easily overcome. Thus the great strain is transferred from the slot of the bar in which the shanks rest in a great measure to the forks $r$ $r$, thereby strengthening the whole and preventing the wear of the sides of the slots. In addition to this advantage I gain another of great importance by their use. In adjusting the shanks up or down in the bars by means of the adjusting-holes $n$ $n$ the angle of the teeth with the ground over which they pass is varied to suit convenience or necessity. A shorter adjustment gives a greater acuteness, and vice versa. This variation of the angle is represented by the different positions of the shanks in Fig. 3. The importance of this adjustment of the angle is readily seen. By it the teeth are arranged to suit different kinds or conditions of soil, or to plow deeper or shallower, as may be desired, which is a matter of necessity in the covering of different kinds of grain. Thus arranged, if at any time the teeth come in contact with an obstruction not easily overcome the wooden pins $p$ $p$ break, thus saving injury to the machine. In such case, to prevent the shanks from dropping out of their place, a pin, $s$, is secured to the upper end of each, substantially as represented.

On the opposite extremities of the shaft N of the teeth-bars, and outside the latter, respectively rest the ends of the connecting-arms $t$ $t$, the opposite ends thereof being pivoted in like manner to a cross-bar, Q, resting under the teeth-bars. To this cross-beam, about midway, is secured a rod, $u$, extending upward and attached to the end of a hand-lever, S, that has its fulcrum at $v$, and extends forward, and is secured at any time when the teeth are to be raised from the ground to a hook, T, as represented by red lines, or in any other convenient manner-

I claim—

1. In combination with the convex rounded scatterers M M, the conductors L L, the bottom discharge-opening thereof being formed of narrow oblong shape longitudinally of the scatterers, in order to direct the seed to the center of the same, and thus insure its proper and equal dispersion at all times, constructed and arranged as herein set forth.

2. The teeth-shanks P P, provided with adjusting-holes $n$ $n$ $n$, and with the rearwardly-projecting forks $r$ $r$, in combination with the bars O O, the whole arranged so that the said shanks are braced against obstructions, and so that they may be set at different angles, constructed and arranged as herein described.

In witness whereof I have hereunto signed my name in the presence of two subscribing witnesses.

WM. WORKMAN.

Witnesses:
G. E. BUSHNELL,
L. HAZEN.